US007248470B2

(12) United States Patent
Chen et al.

(10) Patent No.: US 7,248,470 B2
(45) Date of Patent: Jul. 24, 2007

(54) COMPUTER SYSTEM WITH PCI EXPRESS INTERFACE

(75) Inventors: Yu-Guang Chen, Taipei (TW); Ying-Chun Tseng, Taipei (TW)

(73) Assignee: Asrock Incorporation, Taipei Hsien (TW)

( * ) Notice: Subject to any disclaimer, the term of this patent is extended or adjusted under 35 U.S.C. 154(b) by 69 days.

(21) Appl. No.: 11/127,274

(22) Filed: May 12, 2005

(65) Prior Publication Data

US 2005/0277337 A1 Dec. 15, 2005

(30) Foreign Application Priority Data

May 12, 2004 (TW) ............................... 93113280 A

(51) Int. Cl.
*G06F 1/16* (2006.01)

(52) U.S. Cl. ........................ 361/686; 710/307; 439/607

(58) Field of Classification Search ................ 710/307; 439/65, 660; 361/607, 695–698, 786, 679–687, 361/724–727
See application file for complete search history.

(56) References Cited

U.S. PATENT DOCUMENTS 7,021,971 B2 * 4/2006 Chou et al. ................. 439/660
2005/0079743 A1 * 4/2005 Hou et al. ..................... 439/65
2005/0228932 A1 * 10/2005 Chen et al. ................. 710/307

* cited by examiner

*Primary Examiner*—Hung Van Duong
(74) *Attorney, Agent, or Firm*—Birch, Stewart, Kolasch & Birch, LLP

(57) ABSTRACT

A computer system comprising a chipset, a PCI Express connector with a preset bandwidth, and a PCI Express daughter board with a bigger bandwidth, is provided. The chipset is provided with a PCI Express controller with the preset bandwidth and electrically connects to the PCI Express connector. The PCI Express connector has a trench formed at an edge thereof. The PCI Express daughter board has a connecting portion with a number of golden fingers greater than a number of contacts of the PCI connector. The PCI Express connector is capable to pair the daughter board with part of the golden fingers located outside the connector.

12 Claims, 9 Drawing Sheets

| No. | A Side | B Side |
|---|---|---|
| 1 | +12V | PRSNT1# |
| 2 | +12V | +12V |
| 3 | RSVD | +12V |
| 4 | GND | GND |
| 5 | SMCLK | JTAG2 |
| 6 | SMDAT | JTAG3 |
| 7 | GND | JTAG4 |
| 8 | +3.3V | JTAG5 |
| 9 | JTAG1 | +3.3V |
| 10 | 3.3Vaux | +3.3V |
| 11 | WAKE# | PWRGD |
| Mechanical key | | |
| 12 | RSVD | GND |
| 13 | GND | REFCLK+ |
| 14 | HSOp(0) | REFCLK- |
| 15 | HSOn(0) | GND |
| 16 | GND | HSIp(0) |
| 17 | PRSNT2# | HSIn(0) |
| 18 | GND | GND |

Fig.12 (Prior Art)

| No. | A Side | B Side |
|---|---|---|
| 1 | +12V | PRSNT1# |
| 2 | +12V | +12V |
| 3 | RSVD | +12V |
| 4 | GND | GND |
| 5 | SMCLK | JTAG2 |
| 6 | SMDAT | JTAG3 |
| 7 | GND | JTAG4 |
| 8 | +3.3V | JTAG5 |
| 9 | JTAG1 | +3.3V |
| 10 | 3.3Vaux | +3.3V |
| 11 | WAKE# | PWRGD |
| Mechanical key | | |
| 12 | RSVD | GND |
| 13 | GND | REFCLK+ |
| 14 | HSOp(0) | REFCLK- |
| 15 | HSOn(0) | GND |
| 16 | GND | HSIp(0) |
| 17 | PRSNT2# | HSIn(0) |
| 18 | GND | GND |
| 19 | HSOp(1) | RSVD |
| 20 | HSOn(1) | GND |
| 21 | GND | HSIp(1) |
| 22 | GND | HSIn(1) |
| 23 | HSOp(2) | GND |
| 24 | HSOn(2) | GND |
| 25 | GND | HSIp(2) |
| 26 | GND | HSIn(2) |
| 27 | HSOp(3) | GND |
| 28 | HSOn(3) | GND |
| 29 | GND | HSIp(3) |
| 30 | RSVD | HSIn(3) |
| 31 | PRSNT#2 | GND |
| 32 | GND | RSVD |

Fig.13 (Prior Art)

COMPUTER SYSTEM WITH PCI EXPRESS INTERFACE

BACKGROUND OF THE INVENTION (1) Field of the Invention

This invention relates to a computer system with a peripheral component interconnect Express (PCI Express) interface, more particularly to a computer system adapting a high speed PCI Express interfaced apparatus to a relative low speed PCI Express connector.

(2) Description of Related Art

A computer system typically includes a main board with a system bus formed thereon as a basic component. Various devices including the central processing unit (CPU), the chipset, and memory on the main board are communicated with each other. The chipset plays an important role in ruling signal and data transmission through the system bus and some periphery buses. In the art, the choice of chipset is highly related to that of the CPU. In addition, there are also various connectors utilizing the periphery buses for connecting periphery components such as the displaying card, hard disks, floppy disks, CDROM, etc.

Referring to FIG. 1, there is a prior art computer system with a Northbridge (NB) 100 and a Southbridge (SB) 200. The NB 100 deals with data and signal transmission among the CPU 120, a main memory 140, and an accelerated graphic port (AGP) connector 160. The NB 100 also communicates with the SB 200 by using a particular transmission protocol. The SB 200 is provided with a PCI controller, an Integrated drive electronics (IDE) controller, an universal serial bus (USB) controller, and other specific controllers for ruling various periphery components such as a PCI connector 220, a CDROM/hard disk 240, a floppy disk 260 and a keyboard/mouse 280, so as to deal with the input/output (I/O) signals with the periphery components 220,240,260,280. Furthermore, the SB 200 also transmits some interrupt requests from the periphery components 220,240,260,280 to the NB 100 for asking the CPU 120 to set up a proper operation schedule dealing with the periphery components 220,240,260,280.

The AGP interface, which is developed to meet the need of handling huge data streams resulted from texture mapping in 3D imaging, is provided to overcome the transmission speed limitation of a traditional PCI interfaced displaying card. However, some advance PCI interfaced periphery components, such as small computer systems interface (SCSI) hard disks with ultra 320 standard and Ethernet adapters supporting transmission speed up to 10 GB, is not compatible with the AGP interface. Also, the operation of those PCI interfaced periphery components may surpass the allowable transmission speed of the traditional PCI interface. Therefore, as a result, a new I/O port interface, i.e. the PCI Express interface, is introduced.

The PCI Express interface, which is developed to replace traditional PCI interfaces, is provided with high transmission speed and great extensibility. For a better understanding, a typical computer system with a PCI Express interface is shown in FIG. 2. The chipset 110 in the computer system may connect to a PCI Express connector 330 with or without a switch 320, and further connect to some traditional PCI connectors 350 by using a bridge 340. Upon such an arrangement, the PCI Express interface can support traditional PCI interfaced apparatus and have potential to replace the PCI interface, or even the AGP interface.

The PCI Express interface featuring a serial point to point connection utilizes a low voltage differential signal (LVDS) (using two transmission lines to create a voltage differential to represent logic signal 0 or 1) transmission to increase the transmission speed with a reduced noise. Under the technique standard of the PCI Express interface, a basic PCI Express link specifies two LVDS, one for transmitting signals, and another for receiving signals. Such a link is also represented as a "lane" with a standardized bit rate of 2.5 Gbps.

As mentioned, it is known that the bandwidth as well as the transmission speed of the PCI Express interface is decided by the amount of lanes, and the increase in lanes implies an increase of contacts within the PCI Express connector. Moreover, it is disclosed that the PCI Express connector may have 1, 2, 4, 8, 12, 16, or 32 lanes and may have a selectable bandwidth ranged from 2.5 Gbps to 80 Gbps.

FIG. 3 shows a typical 1×PCI Express connector 330*a*, and FIG. 12 shows a relative contact definition table to the PCI Express connector 330*a* of FIG. 3. FIG. 4 shows a typical 4×PCI Express connector 330*b*, and on the other hand FIG. 13 shows a contact definition table related to FIG. 4. In the contact definition tables of FIGS. 12 and 13, label "RSVD" represents a preserved contact, label "GND" represents a grounding contact, labels "JTAG1" to "JTAG5" represent testing contacts, label "3.3Vaux" represents a contact for applying a 3.3V auxiliary power, labels "SMCLK" and "SMDAT" represent, respectively, a system management bus clock and a data that control data transmission between the connector and the controller, labels "REFCLK+" and "REFCLK−" represent contacts for delivering reference clock signals for generating differential pairs, labels "HSOp(i)" and "HSOn(i)" represent contacts for transmitting differential pairs, labels "HSIp(i)" and "HSIn(i)" represent contacts for receiving differential pairs, and labels "PRSNT#1" and "PRSNT#2" represent contacts for detecting if a hot plug is present.

As mentioned above and according to FIGS. 12 and 13, the 4×PCI Express connector 330*b* has four "lanes" to represent a bigger bandwidth than the 1×PCI Express connector 330*a* with only one "lane". Comparing the contacts of FIG. 4 to that of the 1×PCI Express connector 330*a* (the contacts #1~#18) in FIG. 3, the 4×PCI Express connector 330*b* has fourteen more contacts (the contacts #19~#32) for providing more "lanes". The additional contacts (the contacts #19~#32) are aligned after a rear end of the original 1×PCI Express connector 330*a*; i.e. after the contact #18 as shown in FIG. 13.

Accordingly, by compared to the 1×PCI daughter board, the 4×PCI daughter board has a wider connecting portion for receiving the contacts of a connector. Therefore, though the PCI Express connector with a preset bandwidth can mate with a PCI Express daughter board with a relative bigger bandwidth, yet such a PCI Express daughter board is still far to be acceptable.

Moreover, the bandwidth of a PCI Express connector provided on the prior art main board is always identical to the maximum supporting bandwidth of the PCI Express controller inside the chipset. Thus, only the PCI Express daughter board with a smaller bandwidth with respect to the PCI Express controller on the main board is applicable. For example, in the case that the chipset on the main board supports only 1×PCI Express interface, a 1×PCI Express interface connector is definitely the only choice. At this time, a 2×PCI Express daughter board who has a bigger bandwidth cannot be accepted in this connector. It is why the misunderstanding that a PCI Express controller cannot operate with a PCI Express daughter board with a bigger bandwidth happens to retard the development of some periphery apparatuses utilizing the PCI Express daughter board.

Therefore, it is definitely of great demand upon how to break the limitation by the chipset standard so as to allow a PCI Express daughter board with a bigger bandwidth to be compatible with a PCI Express controller and a respective connector with a smaller lane.

SUMMARY OF THE INVENTION

A main object of the present invention is to provide a PCI Express connector, which has a preset number of contacts for supporting a preset bandwidth, for accepting a PCI Express daughter board with a bigger bandwidth with respect to the preset bandwidth.

In accordance with the present invention, the computer system comprises a chipset, a PCI Express connector with a preset bandwidth, and a PCI Express daughter board with a bigger bandwidth by comparing to the preset bandwidth. The chipset is provided with a PCI Express controller having the preset bandwidth and electrically connecting to the PCI Express connector. The PCI Express connector has a trench on a sidewall thereof. A connecting portion of the PCI Express daughter board, having a number of golden fingers for excessively supporting the bandwidth thereon, is extended through the trench to expose part of the PCI Express connector.

In an embodiment of the present invention, the PCI Express connector has a fixing structure formed in the trench to fixing the daughter board.

In an embodiment of the present invention, the PCI Express connector has slits at an edge thereof. As the PCI Express daughter board is forced into the PCI Express connector, the slits are split to form a trench at the edge for accepting the connecting portion with some additional golden fingers thereon extending therethrough.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and in which.

FIG. 12 shows a definition table of contacts in a 1×PCI Express connector; and FIG. 13 shows a definition table of contacts in a 4×PCI Express connector.

DETAIL DESCRIPTION OF THE PREFERRED EMBODIMENTS

Figure 5:
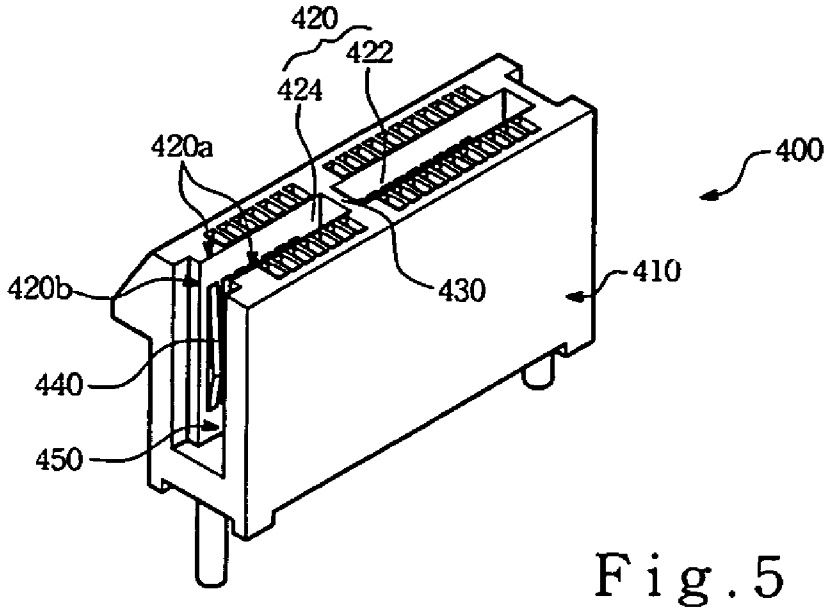
FIG. 5 depicts a perspective view of a first preferred embodiment of the PCI Express connector in accordance with the present invention.

FIG. 5 shows a first preferred embodiment in accordance with the present invention, in which a 1×PCI Express connector 400 is used as an example. The PCI Express connector 400 has a shell body 410 and an upward slot 420 to form therein. A mechanical key 430 is used to divide the slot 420 into a front portion 422 and a rear portion 424. The front portion 422 is provided to locate the contacts #1 to #11 described in FIG. 12, and the rear portion 424 is provided to locate the contacts #12 to #18 described in FIG. 12. Metal pins 440 with respect to the above contacts are assigned to the opposing long sidewalls 420*a* of the slot 420. A trench 450 penetrating through the shell body 410 is formed at an edge 420*b* of the slot 420 adjacent to the contact #18.

Figure 6:
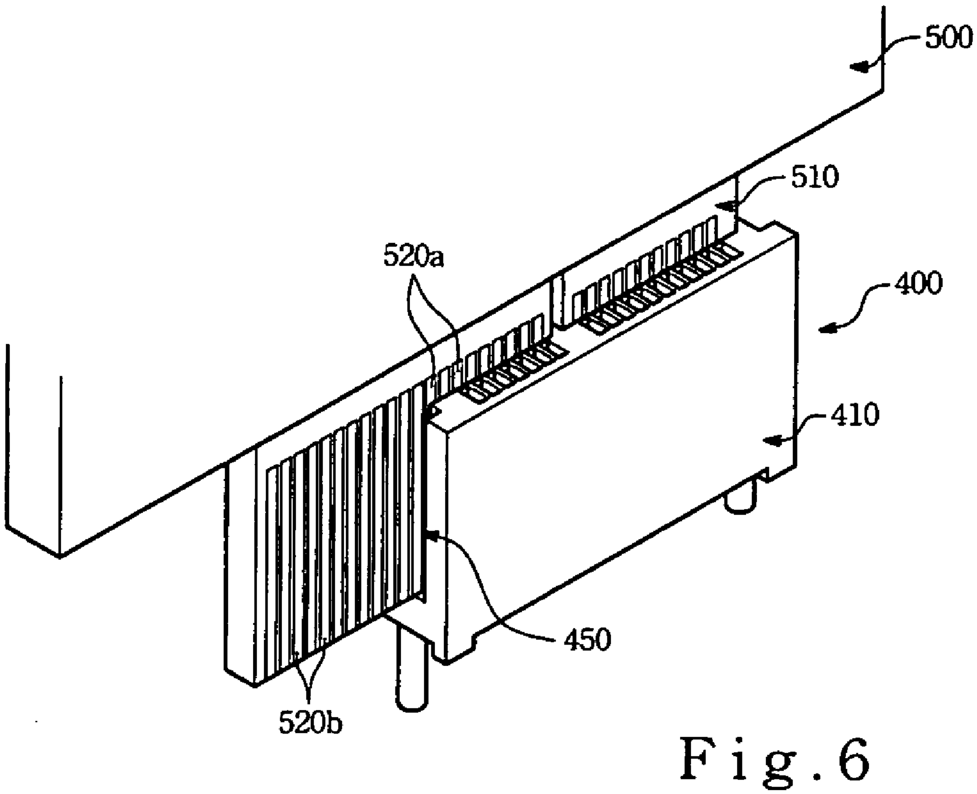
FIG. 6 depicts a perspective view of a PCI Express connector in accordance with the present invention, in which the PCI Express connector mates a PCI Express daughter board with a relative bigger bandwidth.

As shown in FIG. 6, a PCI Express daughter board 500 with a bigger bandwidth with respect to the connector 400 is characterized with a wider connecting portion 510 providing a greater number of golden fingers 520*a* and 520*b*. The trench 450 formed at the edge of the slot 420 is utilized to prevent interference between the connecting portion 510 and the shell body 410, such that the PCI Express daughter board 500 with the wider connecting portion 510 can be accepted by the shorter slot 420.

Figure 1:
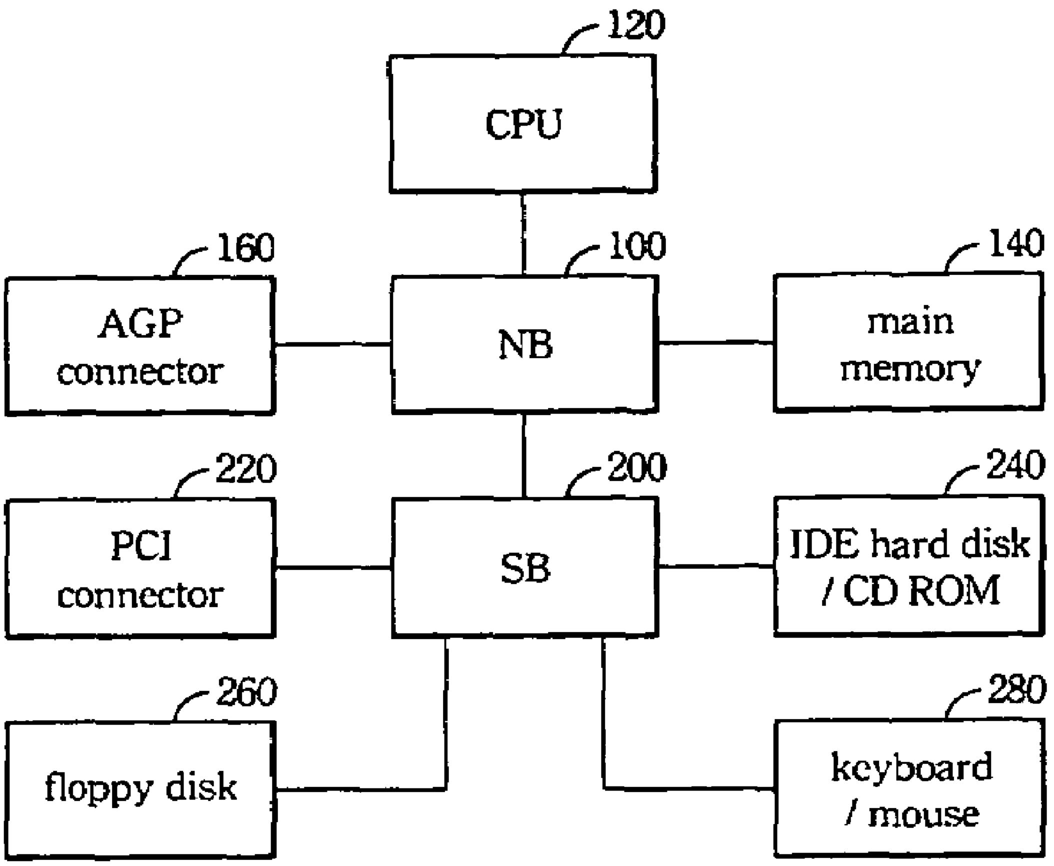
Fig. 1 (Prior Art)
FIG. 1 depicts a schematic block view of a typical computer system.
Figure 2:
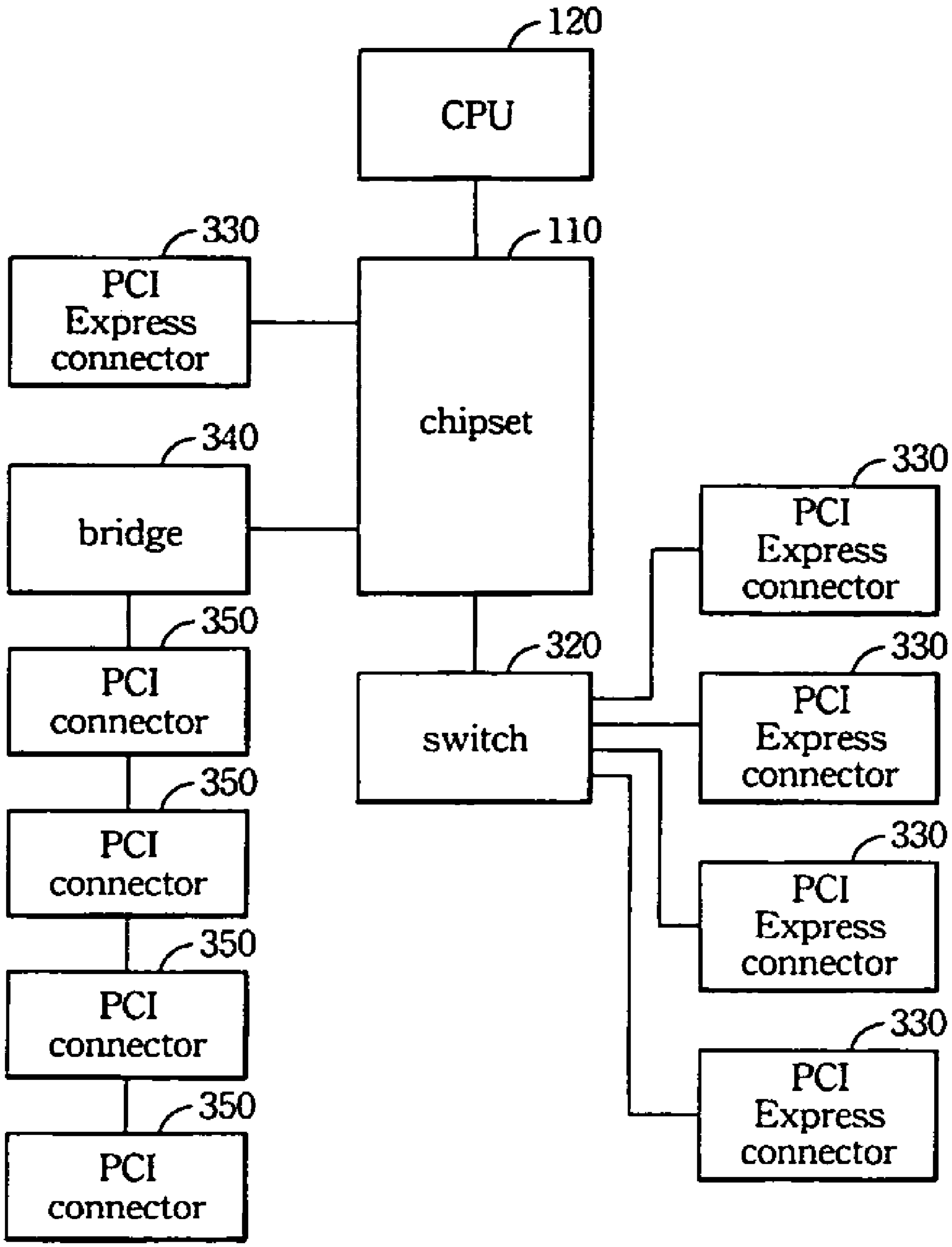
Fig. 2 (Prior Art)
FIG. 2 depicts a schematic block view of a computer system with a PCI Express interface.
Figure 3:
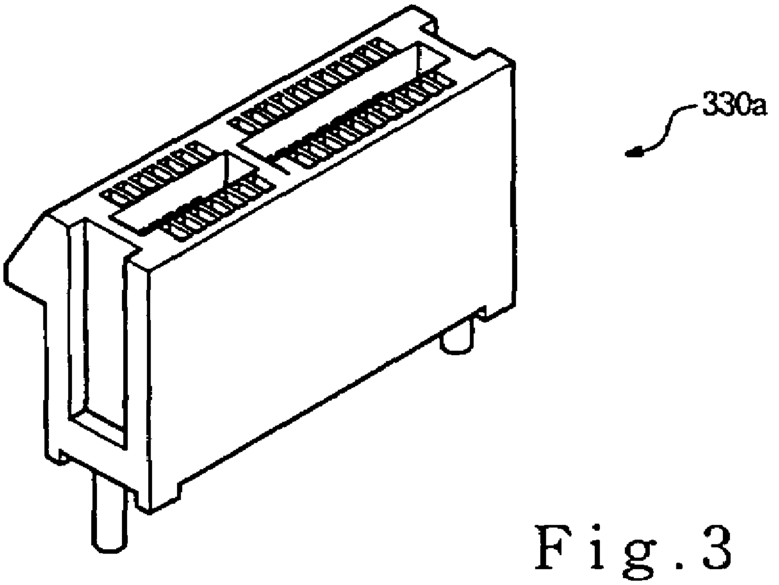
Fig.3 (Prior Art)
FIG. 3 depicts a perspective view of a typical 1×PCI Express connector.
Figure 4:
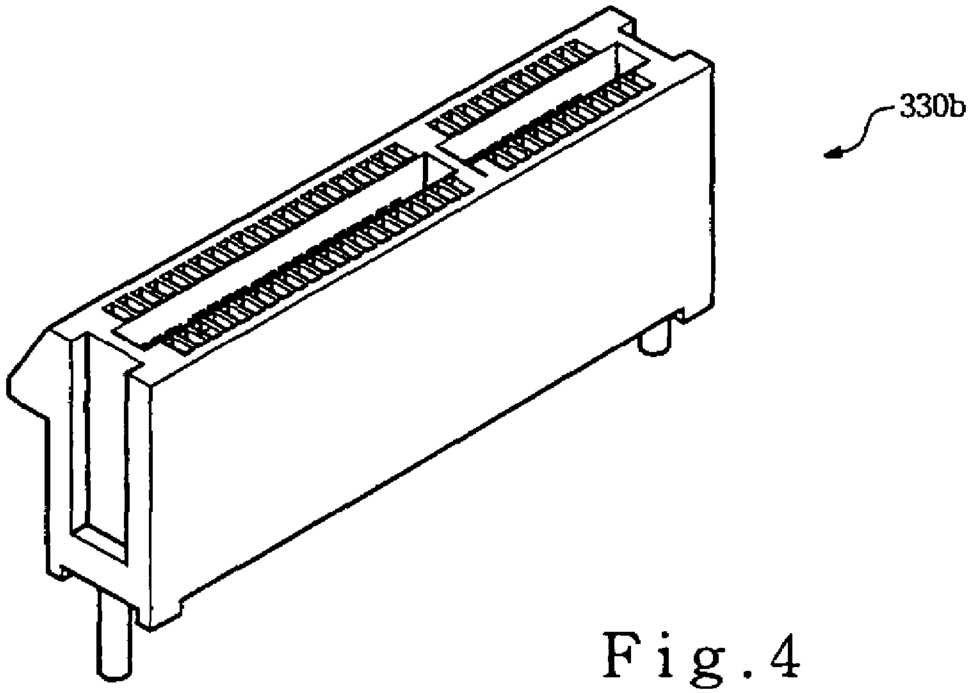
Fig.4 (Prior Art)
FIG. 4 depicts a perspective view of a typical 4×PCI Express connector.

Moreover, it is noted that, as the PCI Express daughter board 500 is mated with the PCI Express connector 400 of the present invention, the golden fingers 520*a* and 520*b* of the PCI Express daughter board 500 cannot be totally accepted in the slot 420 because of a mismatch of contact numbers according to FIG. 3 and FIG. 4. As shown in FIG. 6, there are still some golden fingers 520*b* free of engagement with the slot 420. By forming a trench 450 at the edge of the slot 420, the 1×PCI Express connector may accept a 2×, 4×, 8×, 16×, or 32×PCI Express daughter board without questions.

It is also noted that, according to the contact definition tables of FIG. 12 and FIG. 13, the contacts (#1~#11) about control signals are provided in the front portion 422, and the contacts (#12~) about transmission speed, or say the bandwidth, are provided in the rear portion 424. Even under the particular connection between the PCI Express daughter board 500 with a bigger bandwidth and the PCI Express connector 400 as shown in FIG. 6, the daughter board 500 can still maintain proper electrically connections at the contacts (#1~#11) in the front portion 422. Upon such an arrangement, the opened golden fingers 520*b* of the connecting portion 510 would not affect the normal operation of the PCI Express interface.

Figure 7:
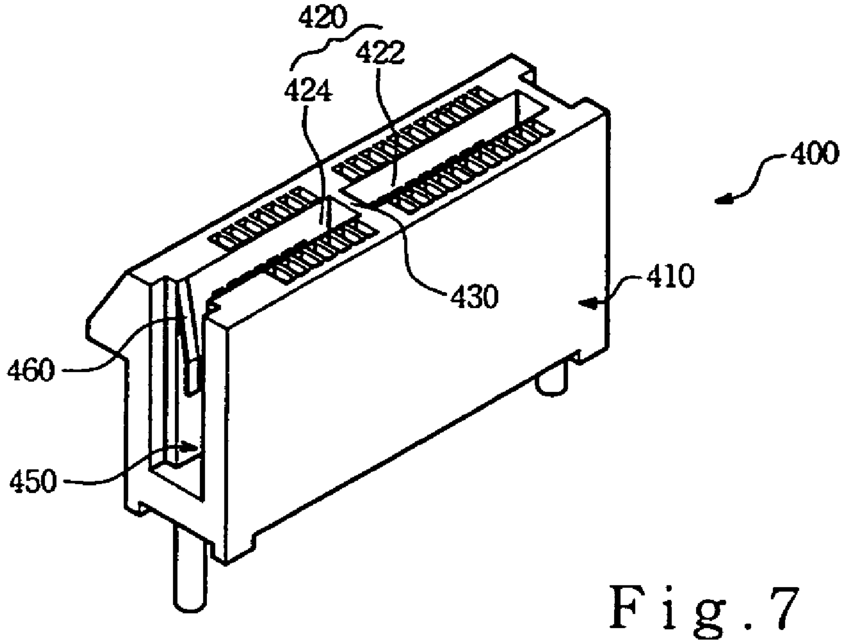
FIG. 7 depicts a perspective view of a second preferred embodiment of the PCI Express connector in accordance with the present invention.

Because of the irregular connection in between, the PCI Express connector 400 may need an additional fixing structure to hold the PCI Express daughter board 500. Referring to FIG. 7, in a second preferred embodiment of the connector 400 in accordance with the present invention, an elastic plate 460 is formed at a sidewall of the trench 450 for fixing the connecting portion 510 of the daughter board. As the connecting portion 510 with golden fingers 520 formed thereon is pushed into the trench 450, the elastic plate 460 is pressed and deformed so as to result in an elastic force to fold firmly the daughter board 500.

Figure 8:
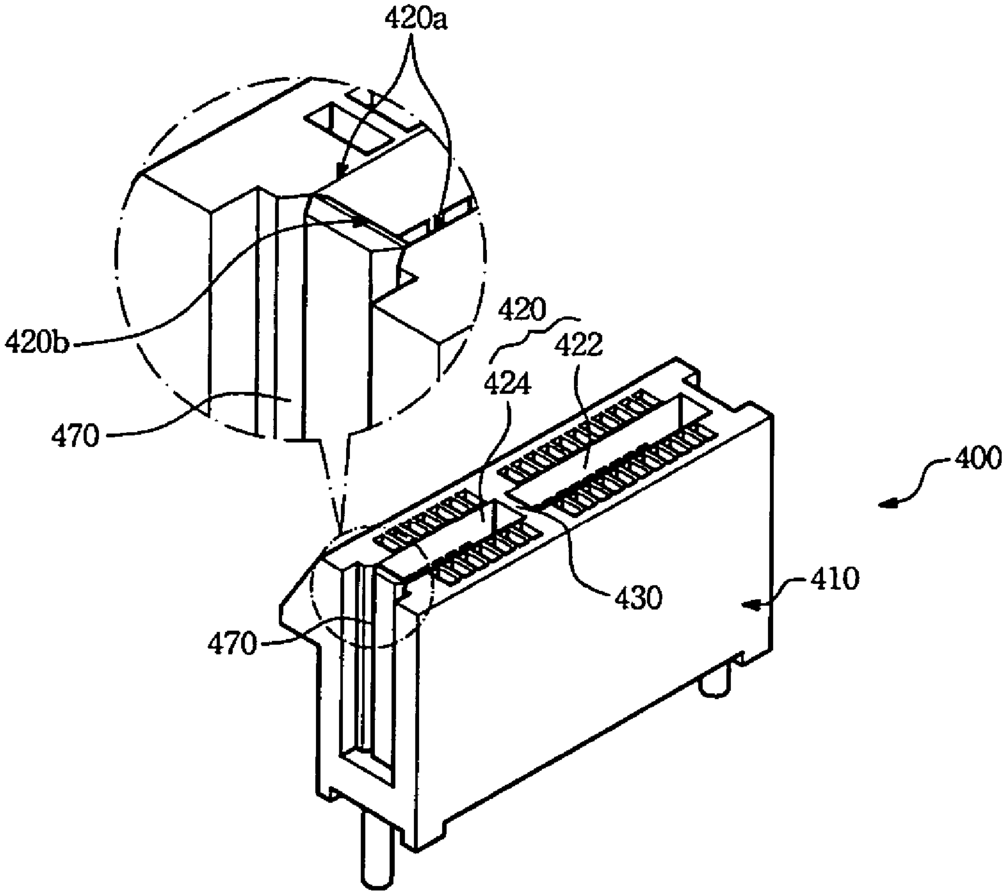
FIG. 8 depicts a perspective view of a third preferred embodiment of the PCI Express connector in accordance with the present invention.

As shown in FIG. 8, in a third preferred embodiment of the connector 400 in accordance with the present invention, two slits 470 are formed at the edge 420*b* of the slot 450 by aligning to the opposing long sidewalls 420*a* of the slot 450. As the PCI Express daughter board 500 with relative wider connecting portion 510 is pushed into the connector 400, the slits 470 are forced to split and a trench of FIG. 5 is thus formed to accept the daughter board 500.

Figure 9:
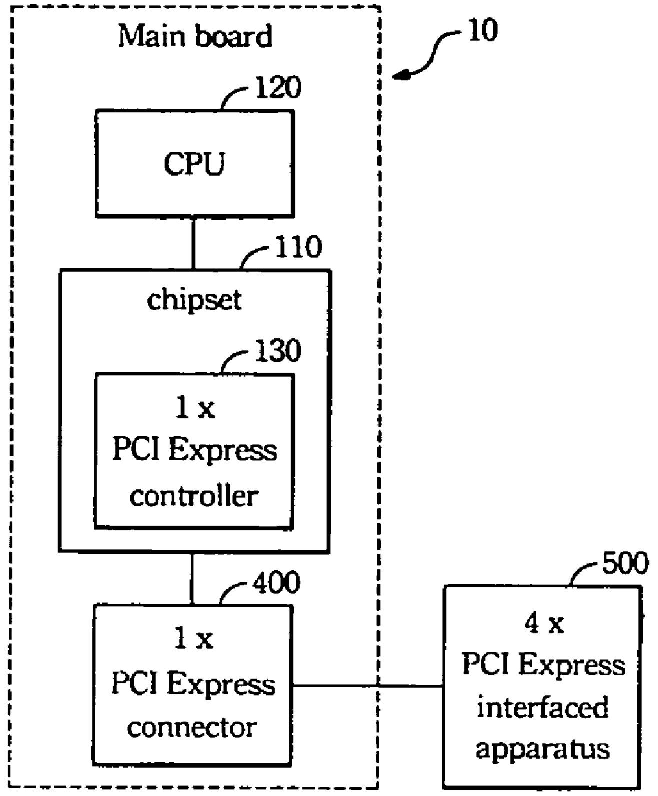
FIG. 9 depicts a schematic block view of a first preferred embodiment of the electronic system in accordance with the present invention.

FIG. 9 shows a first preferred embodiment of an electronic system in accordance with the present invention. The electronic system comprises a CPU 120, a chipset 110, a 1×PCI Express connector 400, and a 4×PCI Express daughter board 500. The CPU 120, the chipset 110, and the 1×PCI Express connector 400 are all formed on a main board 10. The chipset 110 is provided with a 1×PCI Express controller 130 and is electrically connected to the 1×PCI Express connector 400. The 1×PCI Express connector 400, for example the one shown in FIG. 5, features a trench 450 at an edge 420*b* of the slot thereof and is able to accept the 4×PCI Express daughter board 500.

Figure 10:
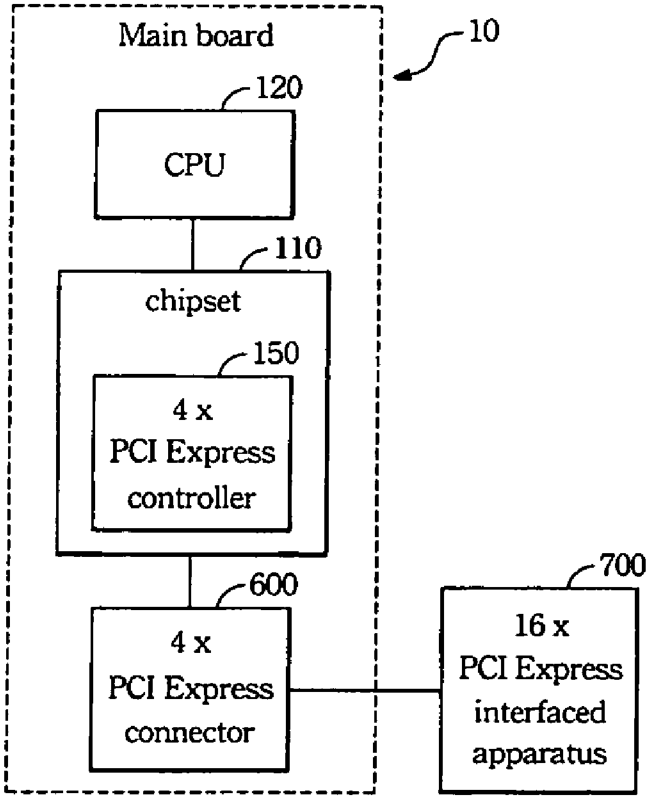
FIG. 10 depicts a schematic block view of a second preferred embodiment of the electronic system in accordance with the present invention.

FIG. 10 shows a second preferred embodiment of an electronic system in accordance with the present invention. By contrast to the embodiment shown in FIG. 9, a 4×PCI Express connector 600 and a 16×PCI Express daughter board 700 are used in the present embodiment. The CPU 120, the chipset 110, and the 4×PCI Express connector 600 are all formed on a main board 10. The chipset 110 is provided with a 4×PCI Express controller 150 and is electrically connected to the PCI Express connector 700.

According to the above-mentioned embodiments, it is noted that a PCI Express connectors in accordance with the present invention can be used in the electronic system to accept a PCI Express daughter board with a bigger bandwidth without considering how many lanes the PCI Express connector supports.

Figure 11:
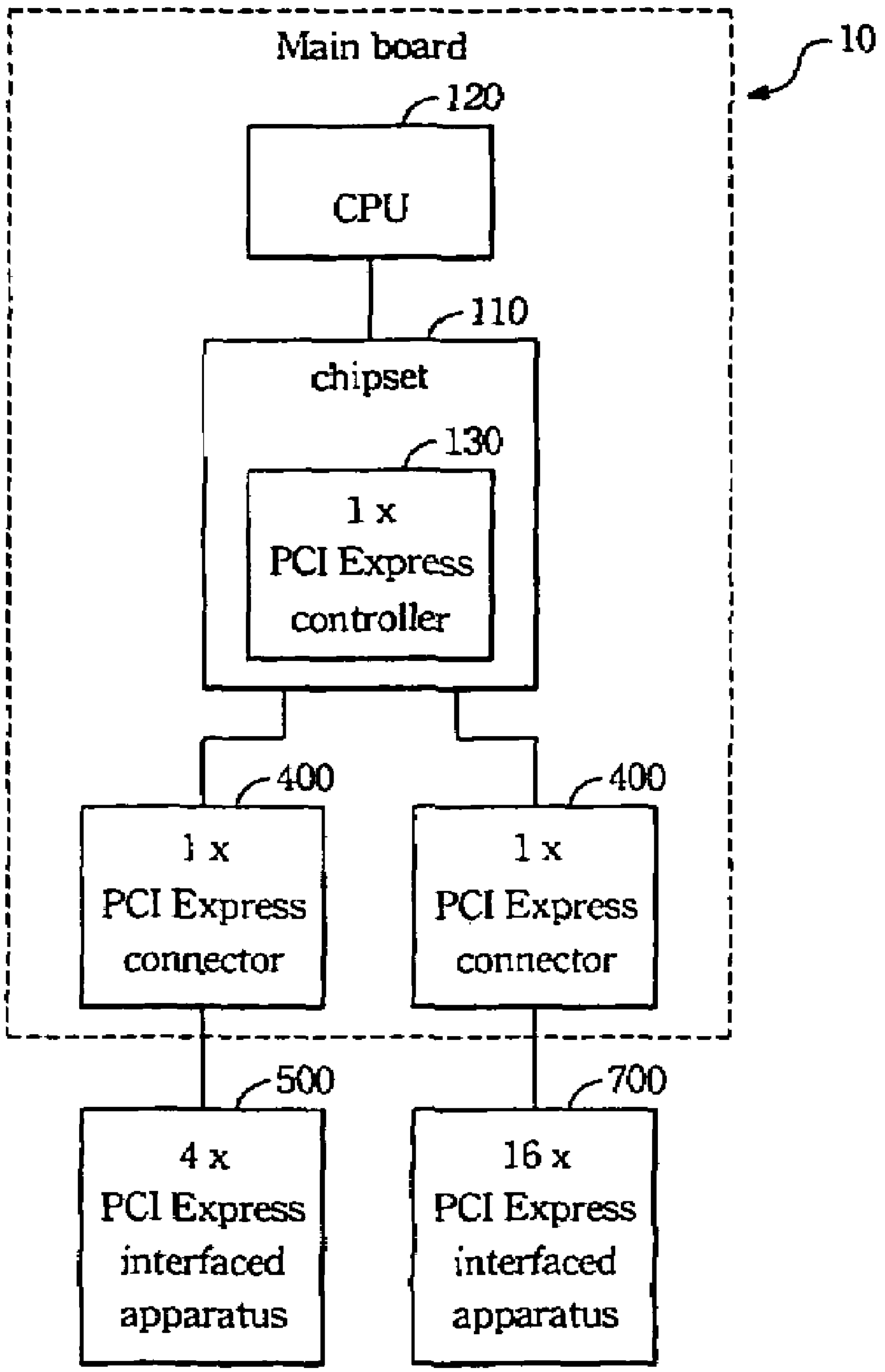
FIG. 11 depicts a schematic block view of a third preferred embodiment of the electronic system in accordance with the present invention.

FIG. 11 shows the third embodiment of an electronic system in accordance with the present invention. By contrast to the embodiment of FIG. 9, two 1×PCI Express connectors 400, a 4×PCI Express interfaced apparatus 500, and a 16×PCI Express interfaced apparatus 700 are used in the present embodiment. The CPU 120, the chipset 110, and the 1×PCI Express connectors 400 are all formed on a main board 10. The chipset 110 is provided with a 1×PCI Express controller 130 therein and is electrically connected to the two connectors 400. It is understood that the electronic system in accordance with the present invention is able to support more than one connector, and thus more than one daughter board with various bandwidths can be acceptable.

Accordingly, the PCI Express connector 400 in accordance with the present invention features a trench 450 to accept the wider connecting portion 510 of the PCI Express daughter board 500 with a bigger bandwidth. Thus, users may choose a faster PCI Express daughter board without regarding whether the chipset on the main board support or not.

With the example and explanations above, the features and spirits of the invention will be hopefully well described. Those skilled in the art will readily observe that numerous modifications and alterations of the device may be made when retaining the teaching of the invention. Accordingly, the above disclosure should be construed as limited only by the metes and bounds of the appended claims.

What is claimed is:

1. A computer system comprising:

a central processing unit (CPU);

a controller electrically connecting to the CPU;

a connector electrically connecting to the controller and having an trench at an edge thereof; and a daughter board having a connecting portion with a plurality of golden fingers thereon, in which part of the golden fingers are accepted into the connector and electrically connecting to the connector;

wherein a number of the golden fingers of the daughter board are greater than a number of the contacts within the connector, and the connecting portion of the daughter board with part of the golden fingers thereon extends outside the connector through the trench.

2. The computer system of claim 1, wherein the connector has a fixing structure formed in the trench for fixing the connecting portion of the daughter board.

3. The computer system of claim 2, wherein the fixing structure is an elastic plate, and, as the daughter board is plugged into the connector, the elastic plate is deformed to generate an elastic force for fixing the daughter board.

4. The computer system of claim 1, wherein the connector is a PCI Express connector with a preset bandwidth, the controller is a PCI Express controller supporting the preset bandwidth, the daughter board is a PCI Express daughter board with a bigger bandwidth with respect to the preset bandwidth.

5. A main board adapting a daughter board comprising:

a central processing unit (CPU);

a controller electrically connecting to the CPU; and a connector electrically connecting to the controller and having a trench at an edge thereof for allowing a connecting portion of the daughter board with golden fingers deformed thereon to penetrate therethrough;

wherein a number of the golden fingers of the daughter board are greater than a number of contacts within the connector, and the connecting portion of the daughter board with part of the golden fingers thereon penetrates through the trench to be outside the connector.

6. The main board of claim 5, wherein the connector has a fixing structure formed in the trench of the connector to elastically fix the daughter board.

7. The main board of claim 6, wherein the fixing structure is an elastic plate, and, as the connecting portion of the daughter board is pressed into the trench, the elastic plate is deformed to generate an elastic force for fixing the daughter board.

8. The main board of claim 6, wherein the connector is a PCI Express connector with a preset bandwidth, the controller is a PCI Express controller supporting the preset bandwidth, the daughter board is a PCI Express daughter board with a bigger bandwidth with respect to the preset bandwidth.

9. The main board of claim 5, wherein the connector has more than one slit formed at the edge thereof, and the slit is split to form the trench as the connecting portion of the daughter board is forced into the connector.

10. A connector for accepting a daughter board having a connecting portion with a preset number of golden fingers thereon comprising:

a shell body having an upward slot therein, an edge of the slot having a trench penetrating through the shell body; and a plurality of contacts arranged along two opposing long sidewalls of the slot, in which a number of the contacts is smaller than the preset number, and in which the trench accepting the connecting portion has the excessive golden fingers located outside the shell body.

11. The connector of claim 10, wherein the connector has a fixing structure formed in the trench of the connector to elastically fix the daughter board.

12. The connector of claim 11, wherein the fixing structure is an elastic plate, as the connecting portion of the daughter board pressed into the trench, the elastic plate is deformed to generate an elastic force for fixing the daughter board.

* * * * *